United States Patent [19]

Degraff

[11] Patent Number: 5,324,456
[45] Date of Patent: Jun. 28, 1994

[54] ULTRAVIOLET RESISTANT GLUTARIMIDE

[75] Inventor: Darnel Degraff, Bensalem, Pa.

[73] Assignee: Rohm and Haas Company, Philadelphia, Pa.

[21] Appl. No.: 905,943

[22] Filed: Jun. 29, 1992

[51] Int. Cl.$^5$ .......................... F21V 9/04; F21V 9/06; C08K 5/34

[52] U.S. Cl. ...................................... 252/589; 524/91

[58] Field of Search ...................... 252/582, 589, 587; 524/91

[56] References Cited

U.S. PATENT DOCUMENTS

| | | | |
|---|---|---|---|
| 4,167,512 | 9/1979 | Lai | 260/239 |
| 4,246,374 | 1/1981 | Kopchik | 525/329 |
| 4,727,117 | 2/1988 | Hallden-Abberton | 525/343 |
| 5,013,774 | 5/1991 | Nishada et al. | 524/91 |

FOREIGN PATENT DOCUMENTS

90/3045557 of 0000 European Pat. Off. .

OTHER PUBLICATIONS

Good-Rite (TM) Hindered Amine Stabilizers, BF Goodrich Product Literature.
Acrylics and HID Light Sources, W. C. Burkhardt, Journal of IES, Jul. 1977, pp. 224–232.

*Primary Examiner*—Philip Tucker
*Attorney, Agent, or Firm*—Richard A. Haggard

[57] ABSTRACT

Polymers of (N-lower alkyl)dimethylglytarimide or (N-hydrogen)-dimethylglutarimide are resistant to molecular weight degradation and yellowing on exposure to heat and ultraviolet or visible light by inclusion of a hindered piperazinone stabilizer.

18 Claims, No Drawings

ULTRAVIOLET RESISTANT GLUTARIMIDE

FIELD OF THE INVENTION

This invention relates to ultraviolet resistant compositions containing stabilized N-(hydrogen) glutarimide or N-(lower alkyl)glutarimide polymers. The stabilized glutarimide polymers have reduced or eliminated molecular weight loss, related to surface cracking or crazing, and color generation caused by exposure to sunlight or other sources of ultraviolet or visible light, especially if the compositions are at the same time subjected to heat. The invention further relates to stabilization of the glutarimide polymers by use of a special type of hindered amine stabilizer, designated herein as hindered piperazinone stabilizer. It further relates to such stabilized polymers also containing other types of light stabilizers including ultraviolet absorbers, such as benzotriazoles, useful in conventional stabilization in the absence of heat, and thermooxidative stabilizers, such as organophosphites or organophosphonites, useful in the retention of good color during processing of the polymers. It further relates to the use of the stabilized polymers as protective coverings, for example, for use on high intensity discharge lamps which emit ultraviolet radiation and generate heat.

BACKGROUND OF THE INVENTION

U.S. Pat. No. 4,246,374 discloses thermally stable polyglutarimide polymers which are useful as clear glazing or protective materials and have acceptable impact and modulus properties with a higher service temperature than other clear thermoplastics. U.S. Pat. No. 4,727,117 discloses polyglutarimides of improved chemical resistance, including water resistance, miscibility, and melt flow.

Poly(glutarimides) are among the best thermoplastics in resistance to weathering. However, they exhibit surface degradation on exposure to ultraviolet (UV) radiation from the sun or from artificial light sources that causes cracking or crazing of the polymer surface, eventually affecting appearance, transparency and resistance to impact. Conventional ultra-violet (UV) stabilizers absorbing in the spectral range of the damaging ultraviolet radiation (ca. 300 nm wavelength) have proved effective in stabilizing samples not exposed to high temperatures, including stabilization of the interior of the polymer specimen.

Polygutarimides are used, for example, in the protection of high intensity discharge lamps, such as those used in street lamps, automotive lighting, and the like. Such lamps generate large amounts of heat and emit a portion of their radiation in the UV spectrum. Since it is often desirable to use as small a lamp enclosure as possible, a plastic protective unit for the lamp is designed so as to operate at as high a temperature as possible consistent with the maintenance of the plastic's shape and modulus. Poly(methyl methacrylate), otherwise a good choice for stability and clarity, fails because the service temperature is too low, and polycarbonate, which has adequate service temperature, fails because it cannot be readily stabilized against UV light.

Polyglutarimides, especially those with a high proportion of (N-methyl) dimethylglutarimide mers, exhibit adequate thermal stability up to at least about 15° C. below the glass temperature. It is desirable to extend their stability to ultraviolet exposure, to lower the cost and extend the timing for replacement, especially as many potential uses are in installations difficult to access, such as street lights and the like.

Stabilization of polyglutarimides against these severe conditions may be accomplished with conventional UV stabilizers, such as benzotriazoles, but amounts exceeding one weight percent often are required, adding additional cost. It is known to stabilize methyl methacrylate polymers with hindered amine stabilizers which do not absorb in the sun-tanning wave length to prepare protective covers for ultra-violet lamps in sun-tanning baths. European Patent Application No. 90/3045557 discloses the use of certain types of hindered amine stabilizers, and benzotriazoles, and phosphorous antioxidants in polyglutarimides as especially effective against UV degradation, particularly under conditions of thermal stress. U.S. Pat. No. 5,013,774 discloses the use of a piperidine hindered amine light stabilizer in combination with a benzotriazole UV absorber in polyglutarimides.

None of these references teaches the stabilizing effect, particularly at relatively high use temperatures, imparted by the hindered piperazinone stabilizers in glutarimide polymers of the present invention, nor does any teach that the hindered piperazinone stabilizer may be used as the sole stabilizer in glutarimide polymers.

It is an object of this invention to provide stabilized polymer compositions which have reduced surface molecular weight degradation on exposure to ultraviolet or visible light, which exposure leads to surface crazing, especially at temperatures near the glass temperature of the polymer. Other objects are to provide a stabilizer which significantly reduces formation of color of the stabilized polymer on weathering; which is stable within the stabilized polymer to exposure to weather conditions such as rain, hail, sleet, and snow; that stabilizes against loss of polymer properties related to molecular weight, such as toughness; and which is useful at relatively low and economical levels. Another object is to provide a stabilized composition of poly(N-lower alkyl) dimethyl glutarimide or poly(N-hydrogen) dimethylglutarimide polymer useful in the manufacture of protective housings for lamps. It is a further object to provide a stabilizer with superior thermal stability and lower volatility, both properties being important for effective stabilization in improved high temperature applications using glutarimide polymers.

SUMMARY OF THE INVENTION

It has been discovered that hindered piperazinone stabilizers, containing one or more functional groups of the formula of Structure I:

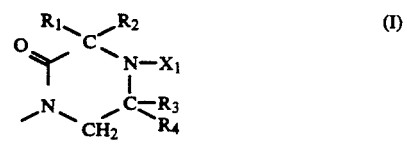

where $R_1$, $R_2$, $R_3$, and $R_4$ may be the same or different lower alkyl group, for example lower alkyl of from 1 to 6 carbon atoms, such as methyl, ethyl, n-propyl, iso-propyl, n-butyl, iso-butyl, tertiary-butyl, n-amyl, iso-amyl, hexyl and its isomers, and the like; and $X_1$ is H, lower alkyl, ethoxy lower alkyl, where lower alkyl is as defined above, or an oxygen radical, represented by—→O, impart excellent stability against the combined effects of ultraviolet light and heat up to about 130° C. or higher, such as up to 15° C. below the glass temperature (Tg) of poly (N-lower alkyl)dimethyl glutaramide and poly (N-hydrogen)dimethyl glutarimide, as measured by reduced molecular weight loss and reduced discoloration upon accelerated weathering.

Thus, there is provided an ultraviolet resistant composition comprising a glutarimide polymer containing mers of a (N-lower alkyl) dimethyl- glutarimide or mers of a (N-hydrogen) dimethylglutarimide; and from about 0.01 to about 2.0 weight percent of a hindered piperazinone stabilizer containing one or more groups of the formula of Structure I, wherein $R_1$, $R_2$, $R_3$, and $R_4$ are the same or different lower alkyl groups, and $X_1$ is H, lower alkyl, ethoxy lower alkyl, or →O, wherein lower alkyl is from 1 to 6 carbon atoms.

Furthermore, the glutarimide polymers containing a hindered piperazinone stabilizer (designated "HPS" hereinafter) as above described may be further stabilized against discoloration by the supplemental inclusion of a thermostabilizer such as an organophosphorous compound, for example, an organophosphite or organophosphonite, during fabrication of the polymer. Another discovery is that the combination of an HPS as above described and a benzotriazole stabilizer is particularly effective in maintaining polymer stability against molecular weight loss and discoloration under accelerated weathering measurement, a measure for predicting outdoor weathering behavior.

DETAILED DESCRIPTION

By glutarimide polymer is meant polymer containing mers of N(lower alkyl) dimethylglutarimide, specifically mers of the formula:

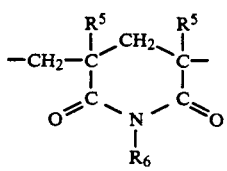

where $R_5$ is methyl, and $R_6$ is hydrogen or lower alkyl of from 1 to 6 carbon atoms such as methyl, ethyl, propyl, butyl, pentyl, hexyl and cyclohexyl and isomers thereof. Also, by glutarimide polymer is meant polymer containing mers of N(hydrogen) dimethyl glutarimide, specifically mers wherein $R_5$ is methyl and $R_6$ is hydrogen.

Preferred for high service temperature are polymers where the weight percent of such glutarimide mers, particularly the N-lower alkyl mers, is from about 50% to about 95% of the composition. Such polymers have a glass temperature or Vicat softening temperature of at least about 140° C., up to 170° C. Especially preferred is glutarimide polymer where the N-lower alkyl is N-methyl. Other mers may be present. Preferred mers are those derived from methacrylic acid, acrylic acid, maleic acid, fumaric acid and the like; esters of these acids such as lower alkyl esters; cyclic anhydrides of these acids, amides of these acids, especially N(lower alkyl) amides; styrene; alpha-methylstyrene; and alkyl styrenes. More preferred are mers selected from lower alkyl methacrylates, or lower alkyl acrylates, such as methyl methacrylate, or methyl or ethyl acrylate. Especially preferred are mers of methyl methacrylate.

The glutarimide polymers which have been described are known; see, for example, U.S. Pat. No. 4,246,374, and U.S. Pat. No. 4,727,117. Both acid-reduced and non-acid-reduced glutarimide polymers may be stabilized against weather or the combined effects of light and heat by the stabilizers taught herein.

The hindered piperazinone (also termed 2-keto-1,4-diaza cycloalkane) stabilizers are known; see, for example, U.S. Pat. No. 4,167,512. Substituents linking more than one 2-keto-1,4-diazacycloalkane (piperazinone) group are covalently bound to the piperazinone by additional steps, such as by condensation reactions or other reactions known to those skilled in the art, with appropriate precursor substituents, thus yielding "polyfunctional" hindered piperazinones as exemplified below. The HPS may be added to the glutarimide polymer by post-compounding of additives and unstabilized powder or pellets of the glutarimide polymer, or by addition during or prior to the imidization or acid-reduction steps. A preferred method is to add the HPS, along with other additives such as toners, colorants, antioxidants, other stabilizers, and the like, to the molten glutarimide polymer or acid-reduced glutarimide polymer prior to extrusion into pellets, strands, sheet, or film. This procedure exposes the polymer and the additive to less heat history than re-processing of already extruded polymer.

Preferred are hindered piperazinone stabilizers of structure I where $R_1$, $R_2$, $R_3$, and $R_4$ are methyl, and $X_1$=H or methyl. Generally, any piperazinone having structure I and molecular weight above about 300 can be beneficially employed in the polyglutarimides of this invention. An example of a useful piperazinone incorporating structure I is the following di-piperazinone, where the hindering alkyl groups are methyl and $X_1$ in this structure is H or methyl:

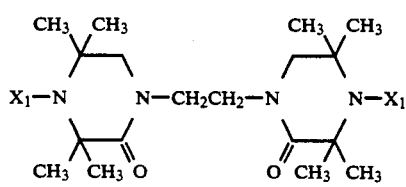

It is preferred, however, that molecular weight of the HPS be above at least 500 for reduced volatility of the piperazinone during processing. Especially preferred for reasons of low volatility and compatibility are HPS containing more than one group of structure I, as linked via appropriate substituent linking groups. Preferred stabilizers of the invention having molecular weight above 500 are represented by the following structures:

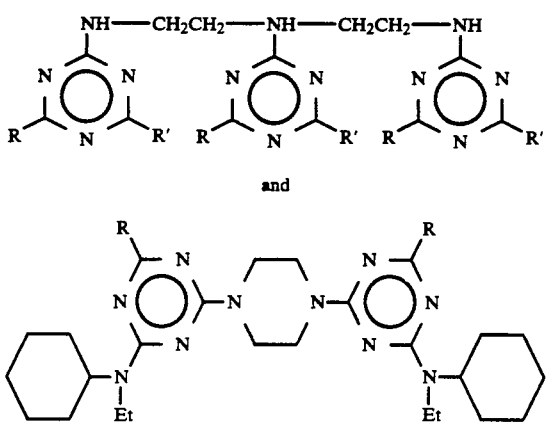

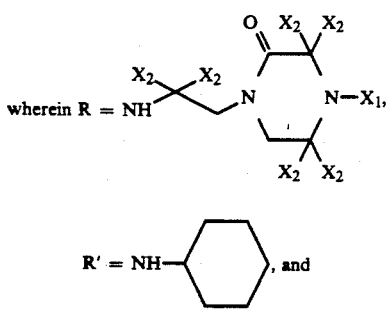

wherein R = NH—...

R' = NH—⟨cyclohexyl⟩, and $X_1$ is as defined in Structure I, and $X_2$=any one of $R_1$, $R_2$, $R_3$ or $R_4$ as defined previously, specifically alkyl groups having from 1 to 6 carbon atoms.

The preferred HPS having molecular weights above about 500, some of which structures are exemplified above, have piperazinone groups of structure I which are linked through the amido nitrogen of structure I (as represented by the single (unlinked) bond in structure I), to substituent groups such as aliphatic ester, aromatic ester, heterocyclic carbon-nitrogen groups such as melamine groups, aliphatic triazine groups, and the like, and are prepared by known methods familiar to those skilled in the art.

Another example of a preferred HPS is that of the following structure, where $X_1$ is as defined in Structure I.

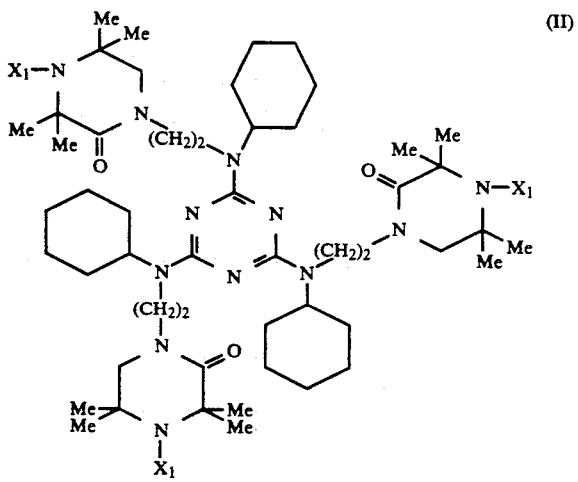

(II)

Especially preferred is Structure II where $X_1$ is H.

The use level of the HPS may be in the range of from about 0.01 to about 2.0 weight percent, based on the weight of the glutarimide polymer, for most efficient cost utilization and stability balance. higher levels of HPS may be used without adversely affecting properties. A preferred HPS use level is in the range of from about 0.05 to about 1.0 weight percent, and an especially preferred use level is in the range of from about 0.2 to about 0.8 weight percent.

Organophosphorous thermal stabilizer also may be present in effective amount for the processing and molding of the compositional polyglutarimide without detracting from the UV stability of the stabilized composition. A preferred class of thermal stabilizer is the organophosphites, such as tris(aryl)- or tris(alkylaryl)- or tris(alkyl)-phosphites, such as tris-(nonylphenyl) phosphite, tris(2,4-di- tert-butylphenyl) phosphite, dis- tearyl pentaerythritol disphosphite and the like. Another preferred class is that of organophosphonites, such as trisaryl, trisalkaryl- or aryldialkaryl- phosphonites, such as aryl-di(alkylphenyl)phosphonites. Preferred are acid-stable tris(2-alkylaryl) phosphites, such as tris(2-tertiary alkylaryl) phosphites, or aryl di(2-alkylaryl) phosphonites. Especially preferred are tris(2,4-tert-butylphenyl) phosphite or tetrakis(2,4-di-tert-butylphenyl) 4,4'-biphenylylene diphosphonite. Effective amounts of organophosphorous thermal stabilizer generally are in the range of from about 0.01 to about 1 weight percent, based on the weight of the glutarimide polymer.

Benzotriazole stabilizers are useful for the protection of glutarimide and other polymers by functioning as absorbers of the harmful portion of the UV spectrum and have been discovered to be particularly useful with the hindered piperazinone stabilizers of the invention. Examples of useful benzotriazoles are: 2-(2'-hydroxy-5'-methylphenyl)benzotriazole; 2-(2'-hydroxy-3',5'-di-tert-butyl)5-chlorobenzotriazole; 2-(2'-hydroxy-3'-tert-butyl-5'-methylphenyl)5-chlorobenzotriazole; 2-(2'-hydroxy-3,5'-di-tert-butylphenyl) benzotriazole; 2-(2'-hydroxy-3',5'-di-tert-butyl-phenyl) benzotriazole; 2-(2'-hydroxy-5'-tert-butylphenyl) benzotriazole; 2-(2'-hydroxy-5'tert-octylphenyl) benzotriazole; and 2-(2'-hydroxy-3'-n-dodecyl-5'-methylphenyl) benzotriazole, of which 2-(2'-hydroxy-5'-methylphenyl) benzotriazole and 2-(2'-hydroxy-5'-tert-octylphenyl) benzotriazole are preferred. The useful levels of thermal stabilizer and of UV-absorbing stabilizer need not be the same in the stabilized plastic. The level of effectiveness of the benzotriazole UV stabilizer generally will be in the range of from about 0.01 percent to about 2%. The preferred range of the benzotriazole stabilizer is from about 0.10 to about 0.50 percent, and of the organophosphite or organophosphonite about 0.05 to about 0.30 percent, based on weight of the glutarimide polymer.

The resulting polymer blend may be molded at temperatures recommended for glutarimide polymers, which range from about 230° C. to about 340° C. The polymers may be extruded into film, formed into parisons and blown, or may be compression or injection molded into useful articles.

Useful articles where stabilization to light and heat is desirable are windows, protective shields, housings, and the like for heat- emitting light sources, especially those which emit ultraviolet light or are severely exposed to same during use. Such include lighting for cars, trucks, airplanes, buses, and the like, especially head- or tail-lamp enclosures, high intensity discharge lighting, such as from metallic vapors, mercury sources, sodium vapor, sunroofs for automobiles, buses, boats, and the like.

The stabilized polyglutarimide compositions of the present invention are also useful in applications as sheet, film, molded articles, or extruded articles not requiring high values of clarity or visible light transmittance. One such use will be in pigmented or colored articles, such as automotive exterior lighting in yellow, red, orange, and the like such as colored tail-lights. A second use will be in surface-altered articles having a matte finish to lower reflectance, alter contact behavior with other surfaces, and the like. Furthermore, the articles may be completely opaque, as will occur in a highly-filled system with an opaque additive or pigment, such as wollastonite, talc, titanium dioxide, and the like. The opaque formulation may also be a blend with an incompatible plastic, or preferably a blend with a compatible plastic which blend also contains an opaque additive. For example, a blend of the stabilized glutarimide with poly(vinyl chloride), said blend also containing an acrylic impact modifier and a pigment such as titanium dioxide, will be opaque and will be useful as extruded siding for outdoor applications, especially in dark colors.

The articles mentioned above may be coated or protected from abrasion by cleaners, storage, dirt, and the like, by use of coatings similar to those taught for non-stabilized glutarimide polymers. Appropriate coatings are preferably based on multi-functional acrylic monomers or on siloxane chemistry. The abrasion-resistant coatings also may contain colloidal dispersions of silica. Abrasion-resistant coatings may be applied with a tie layer imparting flexibility and better adhesion between the abrasion-resistant coating and the stabilized poly(glutarimide) substrate, such as by use of a solution of an acrylic polymer or a polysiloxane. The abrasion-resistant topcoat and/or the tie layer may contain an appropriate stabilizer against the effects of ultraviolet light.

It has been difficult to maintain such coatings on poly-glutarimide substrates, possibly due to failure at the interface. The compositions containing the glutarimide polymers of the present invention will be less susceptible to such degradation. Additional means to improve adhesion include etching of the surface, either physically or with an appropriate solvent, prior to application of the coating, use of an adhesive tiecoat between abrasion-resistant coating and the substrate, and/or use of an ultraviolet stabilizer in the coating to protect against degradation at the surface.

It is also possible to use films or sheets of polyglutarimides stabilized as in this invention to protect one or more second polymers such as unstabilized glutarimides, polycarbonate, and the like, by formation of laminates or overlays. The composite structures may be formed by co-extrusion of layers, by laminating together layers of pre-formed film or sheet, or by other techniques for making laminated structures that will be readily apparent to those skilled in the art.

The layers of the structure are adherent to one another; they may adhere as a result of being co-extruded, of being glued together with a suitable type of adhesive, or of other adhesion processes. The adhesives and the other adhesion processes may be readily selected by those skilled in the art. The layers of the structure are preferably continuous layers, and more preferably they have a uniform thickness. That is, they do not have discontinuities, holes, thin spots and the like. The preferred thickness of both the gas-barrier layers of the stabilized polyglutarimide and of the more permeable layers is from about 0.02 mm to about 10 mm; the layers may be of equal or different thickness. The adhesive, where used, is not usually considered a layer, unless it forms a continuous layer from about 0.02 to about 10 mm thick which is more permeable than the gas-barrier layer.

The composite structure may be biaxially oriented, uniaxially oriented or unoriented.

The uses to which such composite structures may be placed are many. Films may be used in the packaging of many foodstuffs, such as meat, snacks, boil-in-the-bag items such as frozen vegetables, and the like. Containers suitable for the packaging of carbonated or oxygen-sensitive beverages, such as colas, ginger ale, fruit juice, and the like, may be prepared. Containers suitable for hot-fill or sterilization may be molded from suitable injection-molded or extruded parisons. Such containers or bottles may be used for packaging of condiments, ketchup, maple syrup, and the like. They may also be used for heat-sterilized containers, such as for intravenously administered fluids, and the like.

The stabilized compositions of the present invention may be used in combination with reinforcing or filter materials, such as glass fibers, polymeric fibers, glass beads, titanium dioxide, talc, mica, clay, and the like. They may also be used in combination with other polymers with which they are compatible (i.e. with which they may be blended, such as poly(vinyl chloride) or are made compatible with the aid of a suitable compatibilizing polymer or copolymer. They may also be used in combination with other polymers such as polycarbonates, polyesters, and the like. Many uses already established for such blends using the unstabilized poly(glutarimide) require exposure to outdoor or short-wavelength light, where the thermally and ultraviolet resistant compositions of the present invention should exhibit improved stability.

EXAMPLES

The following examples are intended to merely illustrate the present invention and not to limit it. All percentages are by weight unless otherwise specified.

Accelerated testing was used to estimate exposure resistance in all samples. In some accelerated tests, the measurement of surface molecular weight degradation is used to quantify the extent of panel surface degradation; it has been found that this measurement is useful to predict the onset of crazing under actual weathering conditions.

Color resistance testing was carried out with a high intensity discharge (HID) lamp. A review of use of acrylic plastics with such lamps is found in an article by W. C. Burkhardt, Journal of I.E.S., pp. 224–232, July 1977. The article describes the test unit used which is a cylinder rotating around a HID lamp, the center of the plaques being about 152 mm. from the center of the light source. The light source was a metal halide lamp, GTE Sylvania Metalarc M 400/U. Test plaques were exposed to the glowing lamp while being constantly rotated around the lamp via the rotating cylinder. The temperature of the surrounding air was controlled by a blower and fan and was monitored at about 125° C. during testing.

Measurements

Molecular weight measurements were made by gel permeation chromatography (GPC) using calibrated poly methylmethacrylate standards. Weight average molecular weight (Mw) was the molecular weight measurement of comparison. For molecular weight measurement on test samples, 2–3 mil thick films were exposed to the metal halide lamp as described. Samples were taken at specified exposure times and analyzed by GPC. Percent Mw retention was calculated from the unexposed control as follows:

% Mw retention=Mw after exposure×100/Mw before exposure.

Yellowness Index (YI) was measured on a Hunter Colorimeter using ASTM Method D1925. Difference in YI (ΔYI) was calculated by taking the difference between the YI value measured at a given exposure time and the YI measured at zero time on the same sample.

Luminous Transmittance (LT) was measured on sample plaques according to ASTM Method D 1003. Changes in LT (ΔLT) were determined by measuring the difference in LT before and after exposure at the exposure time stated.

Preparation of Polyglutarimides

The glutarimide polymers of the present invention were prepared by known methods via the reaction of a poly(methyl methacrylate) homopolymer of weight average molecular weight, $M_w$, ca. 150,000 with mono methylamine in a devolatilizing twin-screw reactor. The glutarimide polymers with reduced acid/anhydride content were prepared by known methods via the reaction of non acid-reduced polyglutarimides with an agent for reducing acid/anhydride, dimethyl carbonate ("DMC"). The glutarimide polymers were isolated by stranding, cooling, and pelletizing.

A sample of non acid-reduced polyglutarimide, designated PGI No. 1, containing no additives was prepared in a 5.1 cm. extruder at an imidization level of 75%. PGI No. 1 had a Vicat softening temperature of 150° C. (ASTM D-1525, at a rate of 2° C. per minute using a 1 Kg. load).

A sample of acid-reduced polyglutarimide, designated PGI No. 2, also containing no additives, was prepared by conventional treatment of PGI No. 1 with DMC in the extruder. The resulting PGI No. 2 had a Vicat softening temperature of 145° C. (ASTM D-1525, rate and load as defined previously.)

EXAMPLES 1-4

Preparation of Test Sample Compositions with PGI No. 2

Polyglutarimide sample, PGI No. 2, was compounded with the following stabilizers at the weight percent stated, based on weight of the glutarimide polymer:

Example 1: No stabilizer added (a non-stabilized control).
Example 2: 1.4% of the hindered piperazinone stabilizer (HPS) of structure II, where $X_1$ is H.
Example 3: 1.5% of the following benzotriazole stabilizer, 2-(2'-hydroxy-5'-tert-octylphenyl) benzotriazole ("HOB").
Example 4: 1.4% of the HPS of structure II ($X_1$=H) and 0.10% of HOB.

Compounding was accomplished by blending pellets of PGI No. 2 with weighed amounts of the stabilizer(s), charging the blend to the hopper of a 2.54 cm. diameter single-screw Killion extruder, and extruding the mixture into pellets, utilizing a melt temperature between 230°-260° C.

The samples were compression molded to 2 to 3 mil thickness films in a Carver press with a spacer of appropriate thickness to form a 10×10 cm. shaped film. The pre-dried pellets were weighed, pre-heated for three minutes, then pressure applied for 7 minutes at 248° C. The pressure used was 172M Pa (25,000 psi). The resulting film was then removed and cooled in a water-cooled press at 13.8M Pa (2,000 psi) for 2 minutes, then removed and cooled to room temperature for testing.

Samples also were injection molded to provide 5.0×7.6×0.32 cm plaques. Injection molding was carried out on a Polytronica Model 221E/17 Arburg molding machine having a 28.5×10³ Kg (28 ton) capacity. Conditions for injection molding on the Arburg were: nozzle and 3-zone temperature, 280° C.; injection pressure, 4.5M Pa; hold and back pressure, 3.8M Pa; screw speed, 400 rpm; mold temperature, 93°-95° C. Following injection molding, plaques were retained at room temperature until tested.

EXAMPLE 5

Accelerated Testing of Samples 1-4

This example illustrates the comparative retention of molecular weight, resistance to color change (Delta YI), and light transmittance, upon irradiation of the samples of Examples 1-4. Data are summarized in Table 1.

TABLE 1

PERCENT RETENTION OF MOLECULAR WEIGHT OF POLYMER AT PANEL SURFACE, POLYMER COLOR AND LIGHT TRANSMITTANCE CHANGE, UPON METAL HALIDE LAMP ILLUMINATION
(Polymer PGI No. 2)

| Example No.[1] | Stabilizer | Mw Retained after 1000 hours[2] | ΔYI[3] 12 weeks | ΔYI[3] 23 weeks | ΔLT[4] 23 weeks |
|---|---|---|---|---|---|
| 1 | None | 44 | 13 | 16 | −6.52 |
| 2 | HPS (1.4%) | 82 | 3.3 | 5.8 | −3.54 |
| 3 | Benzotriazole (1.5%) | 77 | −0.3 | 6.0 | −2.64 |
| 4 | HPS (1.4%) and Benzotriazole (0.1%) | 77 | −2.8 | −3.7 | −0.53 |

Notes:
[1] Examples prepared from low acid-containing polyglutarimide, PGI No. 2, and containing stabilizers as compounded and described above.
[2] Percent weight average molecular weight (Mw) retained in films prepared and exposed as described.
[3] Change in yellowness index (ΔYI) of plaques prepared and exposed as described and measured by ASTM Method D1925.
[4] Luminous transmittance (LT) measured by ASTM D-1003; data here are the LT change measured from the same sample of each at zero weeks of exposure.

Upon exposure to the metal halide lamp radiation at about 125° C. for 1000 hours, the unstabilizer control polymer of low acid-containing PGI, PGI No. 2, Example 1, has suffered a weight average molecular weight loss of more than 55%. Example 2, the polymer identical to Ex. 1 except containing 1.4 wt. % of the described piperazinone (HPS of structure II), retains more than 80% of its Mw after identical exposure. Example 3, the polymer containing a high level (1.5%) of benzotriazole HOB, also retains a high level of Mw (77%), as does Example 4, the polymer containing 1.4% of the HPS II and a low (0.1%) level of HOB.

Table 1 data also show the color change after 12 and 23 weeks of exposure. A large color change occurred (ΔYI 16 at 23 weeks) in unstabilized Example 1, as expected, following the described metal halide lamp exposure. Example 2, containing 1.4 wt. % of the described piperazinone, showed a change of only 5.8 after 23 weeks. At the end of 23 weeks, examples 3 and 2 showed about the same amount of yellowing, although much less than in control example 1. Example 4, containing both piperazinone and benzotriazole, has not yet begun to yellow at 23 weeks' exposure (negative ΔYI indicating non-yellowing), thus showing the superior and unexpected effect of the stabilizer combination.

Table 1 data also show that light transmission retention by the stabilized samples, particularly Example 4 containing piperazinone and benzotriazole, was very good after 23 weeks of metal halide lamp exposure.

EXAMPLES 6–9

Preparation of Comparative Test Samples with PGI No. 1

Polyglutarimide sample PGI No. 1 was compounded with the following stabilizers at the weight percent stated, based on weight of the glutarimide polymer:

Example 1: No stabilizer added (a non-stabilized control).

Example 2: 1.4% of the hindered piperazinone stabilizer (HPS) of structure II (where $X_1 = H$).

Example 3: 1.5% of the following benzotriazole stabilizer, 2-(2'-hydroxy-5'-tert-octylphenyl) benzotriazole ("HOB").

Example 4: 1.4% of the HPS of structure II ($X_1 = H$) and 0.10% of HOB.

Examples 6–9 were pressed and injection molded into films and plaques identically as described for Examples 1–4.

EXAMPLE 10

Accelerated Testing of Examples 6–9

This example illustrates the retention of molecular weight upon irradiation, and the resistance to color change (Delta YI), of the samples of Examples 6–9. Data are summarized in Table 2, below.

Upon exposure to metal halide lamp radiation at about 125° C. for 1000 hours, the unstabilized control polymer of polyglutarimide polymer, PGI No. 1, Example 6, suffered a weight average molecular weight loss of more than 55%, similar to the low acid-containing, unstabilized PGI of Example 1. Example 7, the polymer identical to Ex. 6 except containing 1.4 wt. % of the described piperazinone of structure II, retained 77% of its Mw after identical exposure. Example 8, the same polymer containing a high level (1.5%) of benzotriazole HOB, retained 65% of its Mw. Example 9, the same polymer containing 1.4% piperazinone and a low (0.1%) level of HOB retained 71% of its Mw.

Table 2 also provides yellowing data after 12 and 23 weeks of exposure, showing the expected, relatively large color change (ΔYI 21) which occurred in unstabilized Example 6 at 23 weeks. Example 7, containing 1.4 wt. % of the piperazinone, shows a color change of only 11 at 23 weeks. Example 8, containing only the benzotriazole (HOB) at a level of 1.5 wt. %, showed a very large color change of 55 at 23 weeks. Example 9, containing both piperazinone and a low level of HOB, was superior in color change, showing a change of only 2 in Yellowness Index after 23 weeks' exposure.

Table 2 data also show that light transmission retention by the piperazinone- and piperazinone/benzotriazole-stabilized samples, was very good after 23 weeks of metal halide lamp exposure. Benzotriazole alone gave poor protection in LT (Example 8), but when included with piperazinone gave superior results (Example 9).

TABLE 2

PERCENT RETENTION OF MOLECULAR WEIGHT OF POLYMER AT PANEL SURFACE, POLYMER COLOR AND LIGHT TRANSMITTANCE CHANGE, UPON METAL HALIDE LAMP ILLUMINATION
(Polymer PGI No. 1)

| Example No.[1] | Stabilizer | Mw Retained after 1000 hours[2] | ΔYI[3] 12 weeks | ΔYI[3] 23 weeks | ΔLT[4] 23 weeks |
|---|---|---|---|---|---|
| 6 | None | 43 | 8.5 | 21 | −7.50 |
| 7 | Piperazinone (1.4%) | 77 | 3.0 | 11 | −3.90 |
| 8 | Benzotriazole (1.5%) | 65 | 19 | 55 | −23.2 |
| 9 | Piperazinone (1.4%) and Benzotriazole (0.1%) | 71 | −0.6 | 2 | −1.06 |

Notes:
[1]Examples prepared from polyglutarimide, PGI No. 1, and containing stabilizers as compounded and described above.
[2]Percent weight average molecular weight (Mw) retained in films prepared and exposed as described.
[3]Change in yellowness index (ΔYI) of plaques prepared and exposed as described and measured by ASTM Method D1925.
[4]Luminous transmittance (LT) measured by ASTM D-1003; data here are the LT change measured from the same sample of each at zero weeks of exposure.

EXAMPLES 11–14

Preparation of Additional Test Samples with PGI No. 2

Polyglutarimide sample PGI No. 2 was compounded with the following stabilizers at the weight percent stated, based on weight of the glutarimide polymer:

Example 11: No stabilizer added (the non-stabilized control).

Example 12: 0.42% of the piperazinone of structure II ($X_1 = H$).

Example 13: 0.42% of the following benzotriazole stabilizer, 2-(2'-hydroxy-5'-tert-octylphenyl) benzotriazole ("HOB").

Example 14: 0.32% of piperazinone II ($X_1$=H) and 0.10% of HOB.

Examples 11–14 were pressed and injection molded into films and plaques identically as described for Examples 1–4.

EXAMPLE 15

Accelerated Testing of Examples 11–14

This example illustrates the resistance to color change (Delta YI), of the samples of Examples 11–14. Data are summarized in Table 3.

TABLE 3

| POLYMER COLOR CHANGE UPON METAL HALIDE LAMP ILLUMINATION (Polymer PGI No. 2) | | |
| --- | --- | --- |
| Example No.[1] | Stabilizer | $\Delta YI$[2] after 6 weeks |
| 11 | None | 14 |
| 12 | Piperazinone (0.42%) | 4.2 |
| 13 | Benzotriazole (0.42%) | 0.7 |
| 14 | Piperazinone (0.32%) and Benzotriazole (0.1%) | −1.2 |

Notes:
[1]Examples prepared from low acid-containing polyglutarimide, PGI No. 2, and containing stabilizers as compounded and described above.
[2]Change in yellowness index ($\Delta YI$) of plaques prepared and exposed as described and measured by ASTM Method D1925.

Table 3 data show the relatively large color change ($\Delta YI$ 14) which occurred in unstabilized Example 11, following the described metal halide lamp exposure after 6 weeks. Example 12, containing 0.42 wt. % of the piperazinone, shows a color change of only 4.2. Example 13, containing only the benzotriazole (HOB) at a level of 0.42 wt. %, also showed good resistance to color change during the relatively short exposure period. Example 14, containing both piperazinone and a low level of HOB, was again superior in PGI No. 2, showing the least color change, non-yellowing, with negative $\Delta YI$, −1.2.

Thus, hindered piperazinone stabilizer (particularly in combination with the benzotriazole) imparted more molecular weight stability than the benzotriazole (HOB) alone with both types of polyglutarimide (PGI No. 1, non acid-reduced, or PGI No. 2, acid-reduced). Furthermore, the combination of the two stabilizers gave superior results over benzotriazole alone, both in the PGI No. 1 and PGI No. 2 samples. In both PGI types, piperazinone alone was effective in repressing molecular weight loss and Yellowness Index change, and in retaining good light transmission characteristics.

While the invention has been described with reference to specific examples and applications, other modifications and uses for the invention will be apparent to those skilled in the art without departing from the spirit and scope of the invention defined in the appended claims.

I claim:

1. An ultraviolet resistant composition comprising:
   a glutarimide polymer containing mers of a (N-lower alkyl) dimethylglutarimide or mers of a (N-hydrogen) dimethylglutarimide; and
   from about 0.01 to about 2.0 weight percent of a hindered piperazinone stabilizer containing one or more groups of the formula

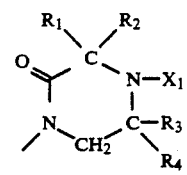

wherein $R_1$, $R_2$, $R_3$, and $R_4$ are the same or different lower alkyl groups, and $X_1$ is H, lower alkyl, ethoxy lower alkyl, or →O.

2. The composition of Claim 1 wherein the glutarimide polymer contains from 50 to 95% of mers of a poly(N-lower alkyl) dimethylglutarimide.

3. The composition of Claim 1 wherein the glutarimide polymer is poly (N-methyl) dimethylglutarimide.

4. The composition of Claim 1 wherein the glutarimide polymer contains mers of methyl methacrylate.

5. The composition of Claim 1 wherein the glutarimide polymer is an acid-reduced poly(N-lower alkyl) dimethylglutarimide.

6. The composition of Claim 1 wherein $X_1$ is H or $CH_3$.

7. The composition of Claim 6 wherein the hindered piperazinone stabilizer is

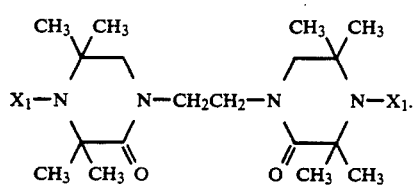

8. The composition of Claim 1 wherein the hindered piperazinone stabilizer is selected from one or more of the following:

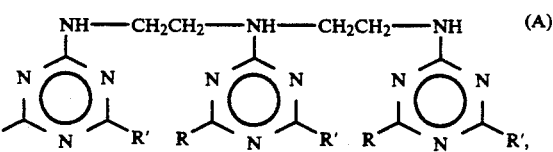

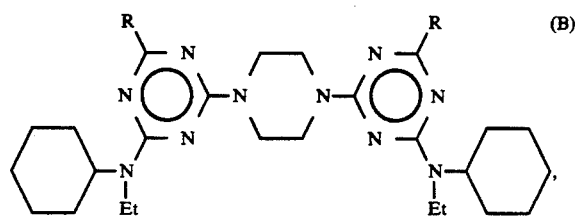

or

-continued (C)

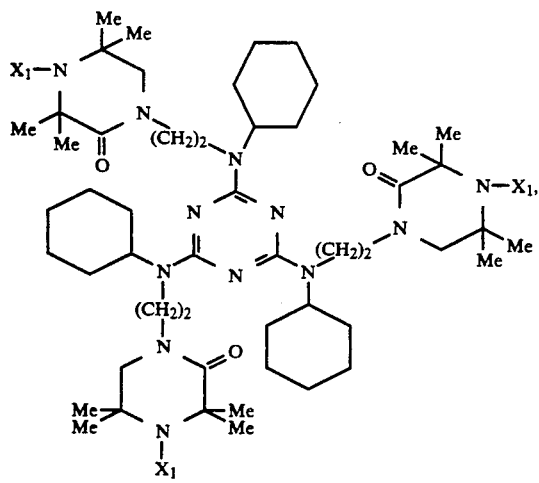

wherein R = 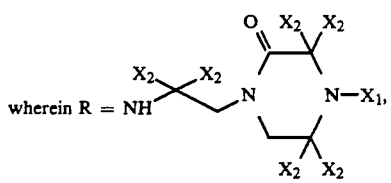

R' = 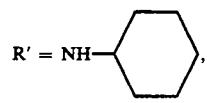

$X_1$ is H, lower alkyl, ethoxy lower alkyl, or→O, and
$X_2$ is lower alkyl.

9. The composition of claim 8 wherein in the hindered piperazinone stabilizer of structure (C), $X_1$ is hydrogen.

10. The composition of claim 1 containing from about 0.05 to about 1.0 weight percent of the hindered piperazinone stabilizer.

11. The composition of claim 1 containing from about 0.01 to about 2.0 weight percent of a benzotriazole stabilizer.

12. The composition of claim 11 wherein the benzotriazole is selected from 2-(2'-hydroxy-5'-methylphenyl)benzotriazole; 2-(2'-hydroxy-3',5'-di-tert-butyl)5-chlorobenzotriazole; 2-(2'-hydroxy-3'-tert-butyl-5'-methylphenyl)5-chloro benzotriazole; 2-(2'-hydroxy-3,5'-di-tert-butylphenyl) benzotriazole; 2-(2'-hydroxy-3',5'-di-tert-butyl-phenyl) benzotriazole; 2-(2'-hydroxy-5'-tert-butylphenyl) benzotriazole; 2-(2'-hydroxy-5' tert-octylphenyl) benzotriazole; or 2-(2'-hydroxy-3'-n-dodecyl-5'-methylphenyl) benzotriazole.

13. The composition of claim 1 containing from about 0.01 to about 1 weight percent of an organophosphorous thermal stabilizer.

14. The composition of claim 13, wherein the thermal stabilizer is selected from a tris-(alkyl) phosphite, a tris-(alkylaryl) phosphite, or an aryldi(alkaryl)-phosphonite.

15. The composition of claim 14, wherein the thermal stabilizer is tris(nonylphenyl) phosphite, tris(2,4-di-tertiarybutylphenyl)phosphite, or distearyl pentaerythritol diphosphite.

16. An article prepared from the composition of claim 1 in the form of a sheet, film, or molded article.

17. The article of claim 16, wherein the sheet, film, or molded article is laminated to one or more second polymers.

18. The article of claim 16, wherein the sheet, film, or molded article has an abrasion-resistant coating.

* * * * *